United States Patent
Katoh

[11] Patent Number: 5,645,286
[45] Date of Patent: Jul. 8, 1997

[54] RESIN BOOT FOR CONSTANT VELOCITY UNIVERSAL JOINTS

[75] Inventor: Toshiharu Katoh, Okayama, Japan

[73] Assignee: NTN Corporation, Osaka-fu, Japan

[21] Appl. No.: 697,500

[22] Filed: Aug. 26, 1996

Related U.S. Application Data

[63] Continuation of Ser. No. 301,641, Sep. 7, 1994, abandoned.

[30] Foreign Application Priority Data

Sep. 30, 1993 [JP] Japan ................... 5-053038 U

[51] Int. Cl.$^6$ ................................. F16J 15/32
[52] U.S. Cl. .................... 277/212 FB; 277/212 R
[58] Field of Search ................... 277/212 R, 212 C, 277/212 FB, 215

[56] References Cited

U.S. PATENT DOCUMENTS

| | | | |
|---|---|---|---|
| 4,516,959 | 5/1985 | Krude | 277/212 FB |
| 4,559,025 | 12/1985 | Dore . | |
| 4,560,178 | 12/1985 | Hempel | 277/212 FB |
| 4,730,834 | 3/1988 | Ukai et al. | 277/212 FB |
| 4,844,486 | 7/1989 | Schiemann | 277/212 FB |
| 4,923,432 | 5/1990 | Porter | 277/212 FB |
| 5,006,376 | 4/1991 | Arima | 277/212 FB |
| 5,251,916 | 10/1993 | Martin et al. | 277/212 FB |
| 5,295,914 | 3/1994 | Milavec | 277/212 FB |

FOREIGN PATENT DOCUMENTS

| | | |
|---|---|---|
| 125 934 | 11/1984 | European Pat. Off. . |
| 347061 | 12/1989 | European Pat. Off. . |
| 7 040 791 | 4/1971 | Germany . |
| 85/05421 | 12/1985 | WIPO . |

*Primary Examiner*—Daniel G. DePumpo
*Attorney, Agent, or Firm*—Nikaido, Marmelstein, Murray & Oram LLP

[57] ABSTRACT

A bellows portion 3 comprises six ridges 3a (3a1, 3a2, ... 3a6 as seen from the smaller diameter portion 2), five troughs 3b (3b1, 3b2 ... 3b5 as seen from the smaller diameter portion 2) and slopes 3c which connect the ridges 3a and troughs 3b. The thickness of each ridge 3a and trough 3b is 0.5–1.45 mm, and the thickness ratio between adjacent and trough 3b (trough/ridge) is (1.0–1.5). The levels of thickness of the ridges 3a and troughs 3b are of the same order when seen in the direction of the axis.

2 Claims, 4 Drawing Sheets

RESIN BOOT FOR CONSTANT VELOCITY UNIVERSAL JOINTS

This application is a continuation of application Ser. No. 08/301,641 filed Sep. 7, 1994 now abandoned.

BACKGROUND OF THE INVENTION

The present invention relates to a resin boot used for constant velocity universal joints.

The majority of resin boots for constant velocity universal joints were made of a rubber material such as chloroprene rubber (CR), but in recent years resin boots have often been employed because of their reliability in durability, heat resistance, cold resistance, high speed rotatability, and resistance to percussion of foreign matter.

FIGS. 3a and 3b show an example of a conventional resin boot. This resin boot is fixed at its larger diameter portion 11 to the outer race 21 of a constant velocity universal joint by a boot band 22 and at its smaller diameter portion 12 to a shaft 23 by another boot band 22. A bellows portion 13 is interposed between the larger and smaller diameter portions 11 and 12 and comprises seven ridges 13a (13a1, 13a2, ... 13a7 as seen from the smaller diameter portion 12), six troughs 13b (13b1, 13b2, ... 13b6 as seen from the smaller diameter portion 12) and slopes 13c which connect the ridges 13a and troughs 13b.

Resin boots are harder (generally, about $H_D$ 50) than rubber boots. Therefore, for a resin boot having the same bellows portion length as that of a rubber boot, if the joint assumes a large operating angle, high tensile strains (strains due to tensile stress) occur in the troughs 13b on the stretch side. Thus, it has been common practice to make the length of the bellows much longer than that of a rubber boot, to use larger numbers of ridges and troughs (seven ridges and six troughs) and fix the resin boot to the joint in a state in which it is somewhat compressed from its free length L'1 (percentage compression; (L'1−L'2)/L'1 is 23–26% or so, where L'2 is the as-installed length), so as to avoid large tensile strains occurring in the troughs 13b even if the joint assumes a large operating angle. As a result, the resin boot has large radial and axial dimensions as compared with the rubber boot.

Further, the conventional resin boot is shaped such that in relation to the thickness ratio between the ridges 13a and troughs 13b (trough/ridge=1.5–2.1 or so) and to the balance of thickness between the ridges and troughs (see Table 1), most of the compression load at the time of mounting is absorbed by the first trough 13b1 while the remaining troughs 13b2 through 13b6 are not compressed so much, the amount of compression decreasing as the larger diameter side is approached (see Table 2).

TABLE 1

| | the thickness of the ridges (mm) (the peripheral minimum value–maximum value) | | | | | |
|---|---|---|---|---|---|---|
| 1st | 2nd | 3rd | 4th | 5th | 6th | 7th |
| 0.80–1.75 | 0.55–0.95 | 0.60–1.00 | 0.75–1.15 | 0.75–1.15 | 0.75–1.15 | 1.30–2.10 |

TABLE 1-continued

| the thickness of the troughs (mm) (the peripheral minimum value–maximum value) | | | | | |
|---|---|---|---|---|---|
| 1st | 2nd | 3rd | 4th | 5th | 6th |
| 1.15–1.60 | 1.25–1.65 | 1.40–1.80 | 1.35–1.75 | 1.40–1.80 | 1.30–2.00 |

TABLE 2

| the percentage compression between the ridges (%) {(L1 − L2)/L1} | | | | | |
|---|---|---|---|---|---|
| 1st–2nd | 2nd–3rd | 3rd–4th | 4th–5th | 5th–6th | 6th–7th |
| 71 | 40 | 27 | 23 | 24 | 20 |

Table 1 shows the levels of the thickness of the ridges and troughs of a bellows portion in a conventional resin boot.

Table 2 shows the percentage compression between ridges during attachment of the conventional resin boot. For this reason, as the boot is axially compressed, the slope 13c extending from the first ridge 13a1 to the first trough 13b1 (said slope being designated by 13c1) and the slope 13c extending from the first trough 13b1 to the second ridge 13a2 (said slope being designated by 13c2) approach each other, resulting in the slope 13c2 being rapidly tilted toward the larger diameter portion 11 rather than becoming perpendicular to the center line X of the boot. This phenomenon, when seen in a compressive load versus amount of axial compression graph shown in FIG. 8, appears as a remarkable point of inflection; the compression load sharply decreases during the compression (loading) process and sharply increases during the load removing process. The durability of the boot is highest in the vicinity of the point of inflection and decreases as the compression proceeds from the point of inflection. The reason is that when the joint assumes a large operating angle, the first trough 13b1 in the stretch side which has a greater amount of compression when attached does not stretch so much because of the presence of the point of inflection (because the compression load sharply increases at the point of inflection) and hence the correspondingly greater tensile load acts in the remaining second trough 13b2 through sixth trough 13b6, producing higher tensile stresses. Particularly, the fifth trough 13b5 and sixth 13b6 having less compression produced therein when attached have greater bending stresses (difference between tensile stress produced in the stretch side and compression stress produced in the compression side) and sometimes the boot life depends largely on the bending fatigue of the fifth and sixth troughs.

As described above, the durability of the resin boot depends largely on the bending fatigue of the bellows portion and this problem has heretofore been coped with by increasing the numbers of ridges and troughs of the bellows portion. Therefore, the shape of the resin boot has necessarily been far larger than that of the rubber boot. Reversely, to make the shape compact, it is necessary to decrease the numbers of ridges and troughs; however, if this measure is actually taken with the conventional design concept retained, greater bending stresses will be produced in the troughs closer to the larger diameter portion, leading to a decrease in durability. That is, it should be said that in the prior art, increased durability of the boot is in inverse relation to its compact shape.

SUMMARY OF THE INVENTION

The present invention, which has been accomplished with the above in mind, is intended to simultaneously solve the two contradicting problems, increased durability and compact size of resin boots, eventually providing a resin boot which has greater durability than that of conventional resin boots and which is as compact as a rubber (CR) boot.

A first form of the invention is characterized in that the thickness ratio (trough/ridge) between adjacent trough and ridge of the bellows portion of a resin boot for constant velocity universal joints is 1.0–1.5.

A second form of the invention is characterized in that the respective levels of the thickness of the ridges and troughs are determined such that the ridges and troughs are respectively substantially the same in thickness as seen in the direction of the axis.

A third form of the invention is characterized in that the angle of inclination formed with respect to the center line of the boot by the slope extending from the ridge to the trough in the larger diameter portion of the bellows portion is smaller than that of the slope which extends from the ridge to the trough in the smaller diameter portion.

A fourth form of the invention is characterized in that the thickness ratio (trough/ridge) between adjoining ridge and trough in the bellows portion is 1.0–1.5, in that the thicknesses of the ridges are substantially the same and the thicknesses of the troughs are substantially the same, and in that the angle of inclination formed with respect to the center line of the boot by the slope extending from the ridge to the trough in the larger diameter portion of the bellows portion is smaller than that of the slope which extends from the ridge to the trough in the smaller diameter portion.

A fifth form of the invention is characterized in that in each of the forms of the invention described above, the boot is made of a resin material whose hardness is $H_D$ 43–48.

From the two major viewpoints (1) to increase the bending fatigue resistance and (2) to ensure that no point of inflection is formed in the compression versus amount of axial compression diagram, the present invention is intended to achieve increased durability of resin boots and their compactness. The first form of the invention solves the problems from the viewpoint (1) and the second and third forms of the invention solve the problems from the viewpoint (2). The fourth and fifth forms of the invention solve the problems from both viewpoints (1) and (2).

The arrangement in which the thickness ratio (trough/ridge) between adjoining ridge and trough in the bellows portion is set at 1.0–1.5 as compared with the prior art (conventionally, trough/ridge=1.5–2.1) increases the elasticity of the troughs relative to the ridges (since the thickness relatively decreases) and decreases the stresses (tensile and compressive) in the troughs, so that the bending fatigue resistance of the troughs improves.

The arrangement in which use is made of a resin material whose hardness is $H_D$43–48 as the boot material increases the elasticity of the material as compared with the prior art (conventionally, $H_D$ 50 or so) and decreases the stresses (tensile and compressive) in the troughs during bending, thereby Improving the bending fatigue resistance of the troughs.

The arrangement in which the respective levels of the thickness of the ridges and troughs are made substantially the same as seen in the direction of the axis distributes the amount of compression in good balance throughout the troughs during attachment of the joint, thus rarely forming points of inflection.

The arrangement in which the angle of inclination of each slope extending from the ridge in the bellows portion to the trough in the larger diameter portion is made smaller than the angle of inclination of each slope extending from the ridge to the trough in the smaller diameter portion distributives the amount of compression in good balance throughout the troughs during attachment of the joint, thus rarely forming points of inflection.

The combined use of said arrangements effectively suppresses bending strains in the troughs, thus greatly improving the durability of the boot. Therefore, it becomes possible to decrease the numbers of ridges and troughs of the bellows portion while retaining the durability of the boot above the level in the prior art, thereby achieving the same degree of compactness as that for rubber boots.

DESCRIPTION OF THE PREFERRED EMBODIMENTS

An embodiment of the invention will now be described.

Figure 1A:
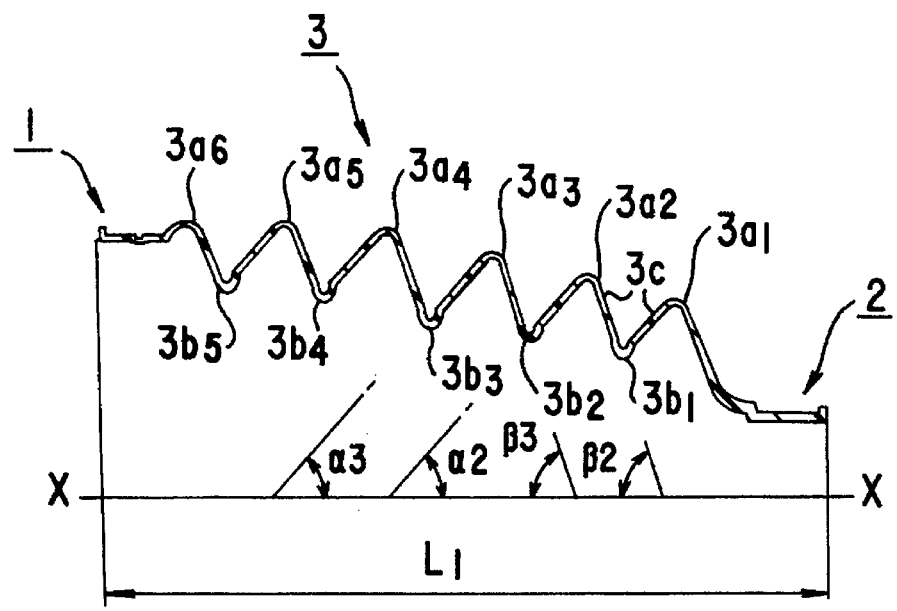
FIG. 1a is a sectional view showing a resin boot according to an embodiment of the present invention.
Figure 1B:
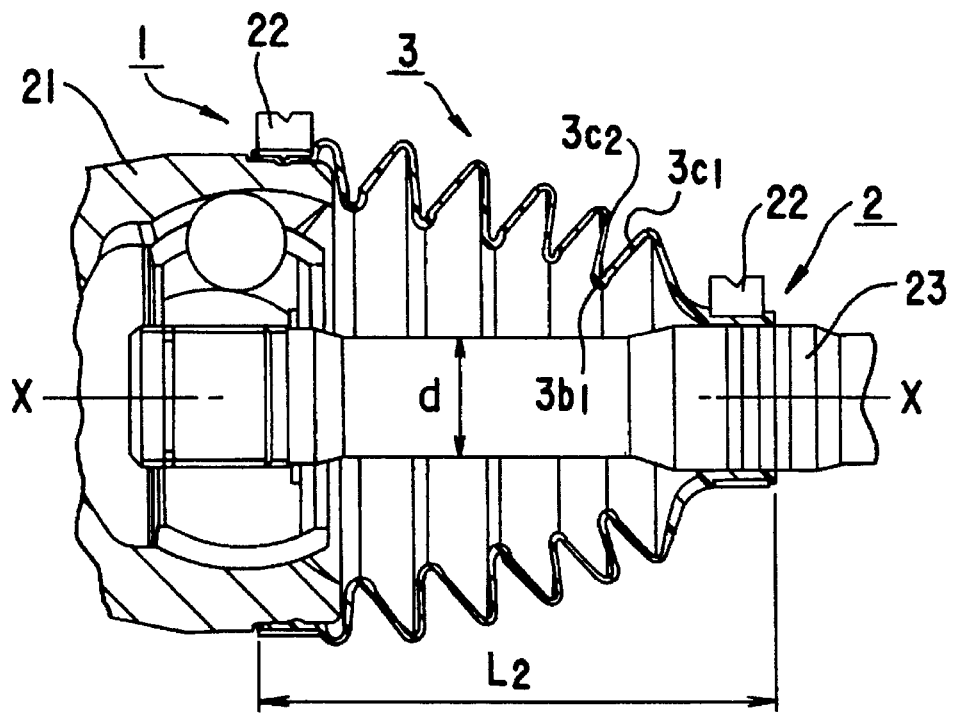
FIG. 1b is a sectional view showing the resin boot of FIG. 1a attached to a constant velocity universal joint.

FIG. 1 shows a resin boot according to this embodiment, wherein FIG. 1(a) shows its free state and FIG. 1(b) shows a state in which the resin boot is attached to a constant velocity universal joint. This resin boot is made of a resin material having a hardness of $H_D$ 43–$H_D$ 48, e.g., thermoplastic polyester polyether elastomer (TPEE) having a hardness of $H_D$ 45–48. The resin boot comprises a larger diameter portion 1 fixed to the outer race 21 of a constant velocity universal joint by a boot band 22, a smaller diameter portion 2 fixed to a shaft 23 by another boot band 22, and a bellows portion 3 connecting said larger and smaller diameter portions 1 and 2.

The bellows portion 3 comprises six ridges 3a (3a1, 3a2, . . . 3a6 as seen from the smaller diameter portion 2), five troughs 3b (3b1, 3b2, . . . 3b5 as seen from the smaller diameter portion 2) and slopes 3c which connect the ridges 3a1 and troughs 3b, thus having one less ridge and one less trough than the conventional resin boot shown in FIG. 5. The first ridge 3a1 has a diameter of 2.7 d based on the shaft diameter d and the fifth ridge 3a5 has a diameter of 4 d based on the shaft diameter d. The resin boot is approximately conical with its diameter gradually decreasing from the larger diameter portion 1 to the smaller diameter portion 2. Thus, this resin boot is considerably compact both radially and axially, as compared with the conventional resin boot, and its free length L1 is about 24% less than that of the conventional resin boot. Further, as shown in FIG. 1b, this resin boot is attached to a constant velocity universal joint as it is somewhat compressed as compared with its free length L1 (the percentage compression (L1-L2)/L1 is about 20%, whereas that of the conventional resin boot is 23–26%), the attachment length L2 being about 16% less than that of the conventional resin boot and being substantially the same as that of the rubber (CR) boot.

As shown in Table 3, the thickness of each ridge 3a and trough 3b is 0.6–1.35 mm (or 0.6–1.8 mm), and the thickness ratio between adjacent and ridge 3b and trough 3b (trough/ridge) is 1.0–1.5 where the thicknesses are the peripheral average value. In this connection, in the conventional resin boot, the thickness of the ridges and troughs is 0.55–2.1 mm and the thickness ratio is 1.5–2.1 (see Table 1); therefore, in this resin boot, as compared with the conventional one, the thickness of the ridges and troughs is decreased and the thickness of the troughs 3b relative to the ridges 3a is decreased. Further, in this resin boot, the levels of thickness of the ridges 3a and troughs 3b are of the same order as seen in the direction of the axis. In addition, the reason why the thicknesses of the ridges and troughs are shown in a given range is that since the molding method for resin boots is blow molding unlike that for CR boots (generally, injection molding is employed for CR boots; in blow molding, only an outer mold is used with no inner mold), there is some variation in the thickness as seen circumferentially.

TABLE 3

| the thickness of the ridges (mm) (the peripheral minimum value–maximum value) | | | | | |
|---|---|---|---|---|---|
| 1st | 2nd | 3rd | 4th | 5th | 6th |
| 0.70–1.10 | 0.60–0.90 | 0.70–1.00 | 0.70–1.00 | 0.70–1.10 | 0.70–1.10 |

| the thickness of the troughs (mm) (the peripheral minimum value–maximum value) | | | | |
|---|---|---|---|---|
| 1st | 2nd | 3rd | 4th | 5th |
| 0.80–1.10 | 0.80–1.10 | 0.80–1.10 | 1.05–1.35 | 0.90–1.20 |

Table 3 shows the levels of the thickness of the ridges and troughs of a bellows portion in the resin boot of the embodiment shown in FIG. 1.

Further, as shown in FIG. 1a, the angle of inclination $\alpha$ ($\alpha$ 1, $\alpha$ 2, ... $\alpha$ 5 as seen from the smaller diameter portion 2) formed with respect to the center line X of the boot by the slopes 3c extending from the ridges 3a to the troughs 3b toward the larger diameter portion is smaller than the angle of inclination $\beta$ ($\beta$ 1, $\beta$ 2, ... $\beta$ 6 as seen from the smaller diameter portion 2) of the slopes 3c extending from the ridges 3a to the troughs 3b toward the smaller diameter portion 2. It is recommended that $\alpha$ 1, ... $\alpha$ 5 be 38°–45° and that $\beta$ 1, ... $\beta$ 6 be 1.3–1.6 (or –1.8) times $\alpha$. in this connection, in the conventional resin boot, $\alpha$ is 40°–60° and $\alpha \approx \beta$.

Since the resin boot of this embodiment is made of a thermoplastic polyester polyether elastomer (TPEE) with a hardness of $H_D$ 45–48 and since the thickness and the thickness ratio of the ridges and troughs are set as described above, the elasticity of the troughs 3b is very high and the stresses (tensile and compressive) in the troughs are correspondingly decreased, thus increasing the bending fatigue resistance. Further, the thickness level of the ridges 3a and troughs 3b are of the same order when seen axially and since the angle of inclination $\alpha$ is smaller than the angle of inclination $\beta$, the compressive load during attachment is absorbed in good balance in the troughs 3b and the troughs 3b are compressed in good balance, as shown in Table 4.

TABLE 4

| the percentage compression between the ridges (%) $\{(L1 - L2)/L1\}$ | | | | |
|---|---|---|---|---|
| 1st–2nd | 2nd–3rd | 3rd–4th | 4th–5th | 5th–6th |
| 48 | 37 | 26 | 17 | 14 |

Figure 2:
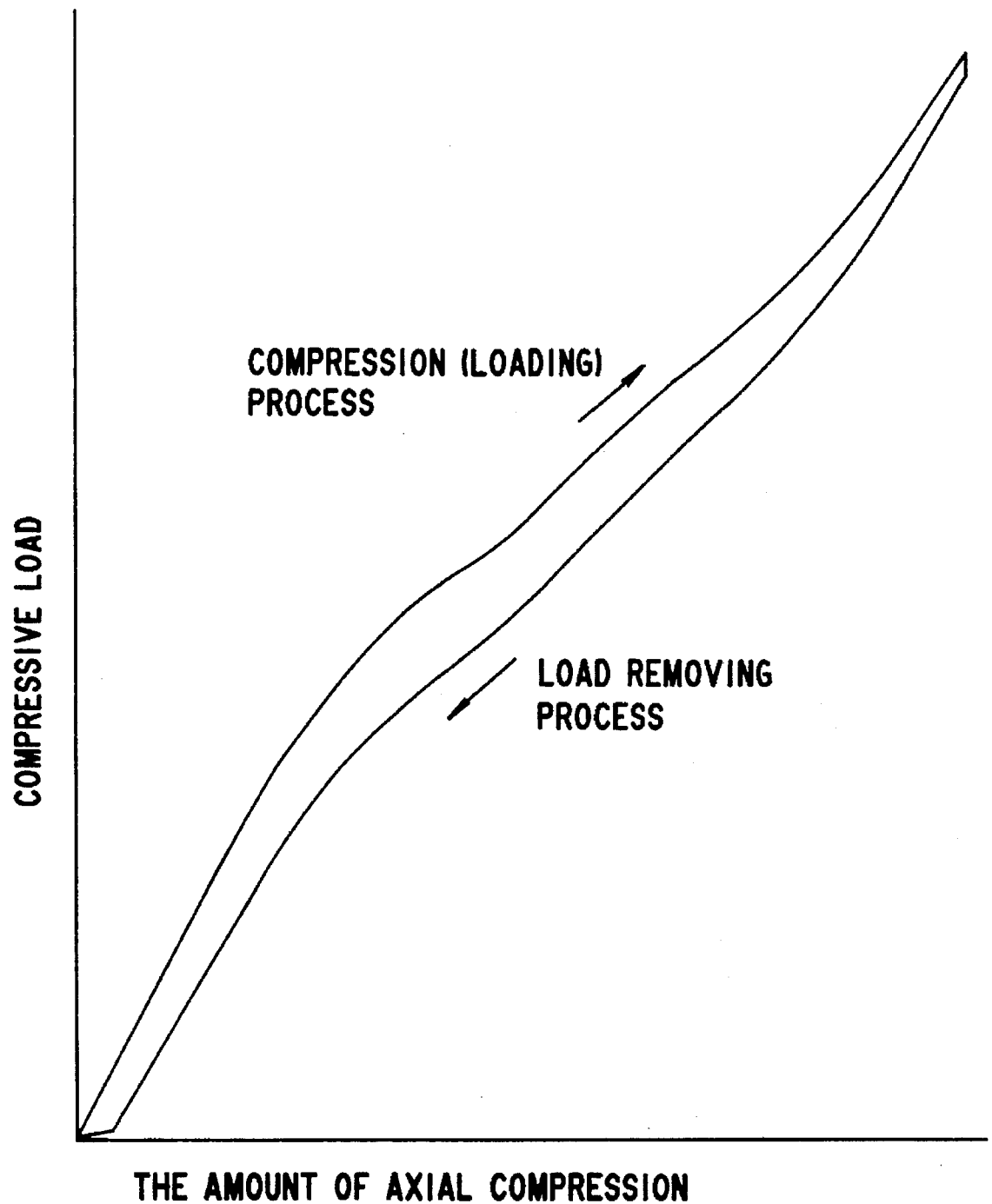
FIG. 2 is a graph of compressive load versus amount of axial compression in the resin boot of the embodiment shown in FIG. 1.
Figure 3A:
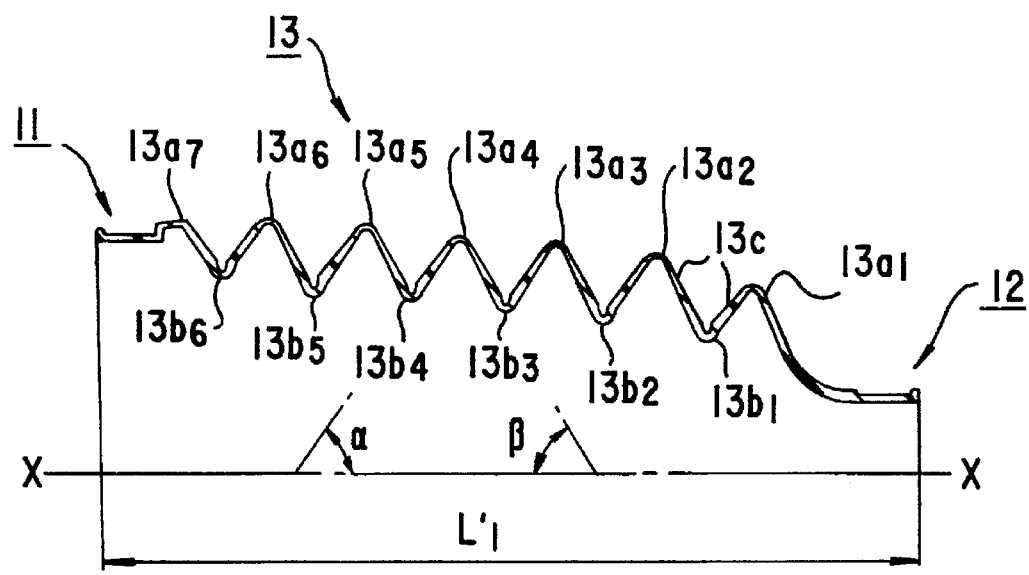
FIG. 3a is a sectional view showing a conventional resin boot.
Figure 3B:
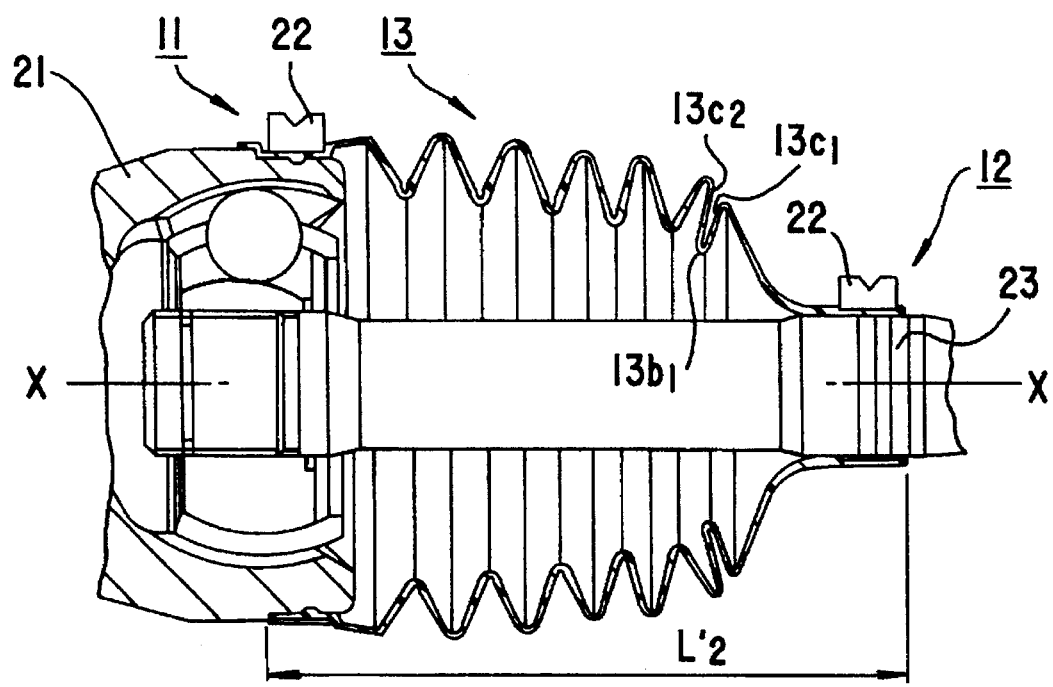
FIG. 3b is a sectional view showing the resin boot of FIG. 3a attached to a constant velocity universal joint.
Figure 4:
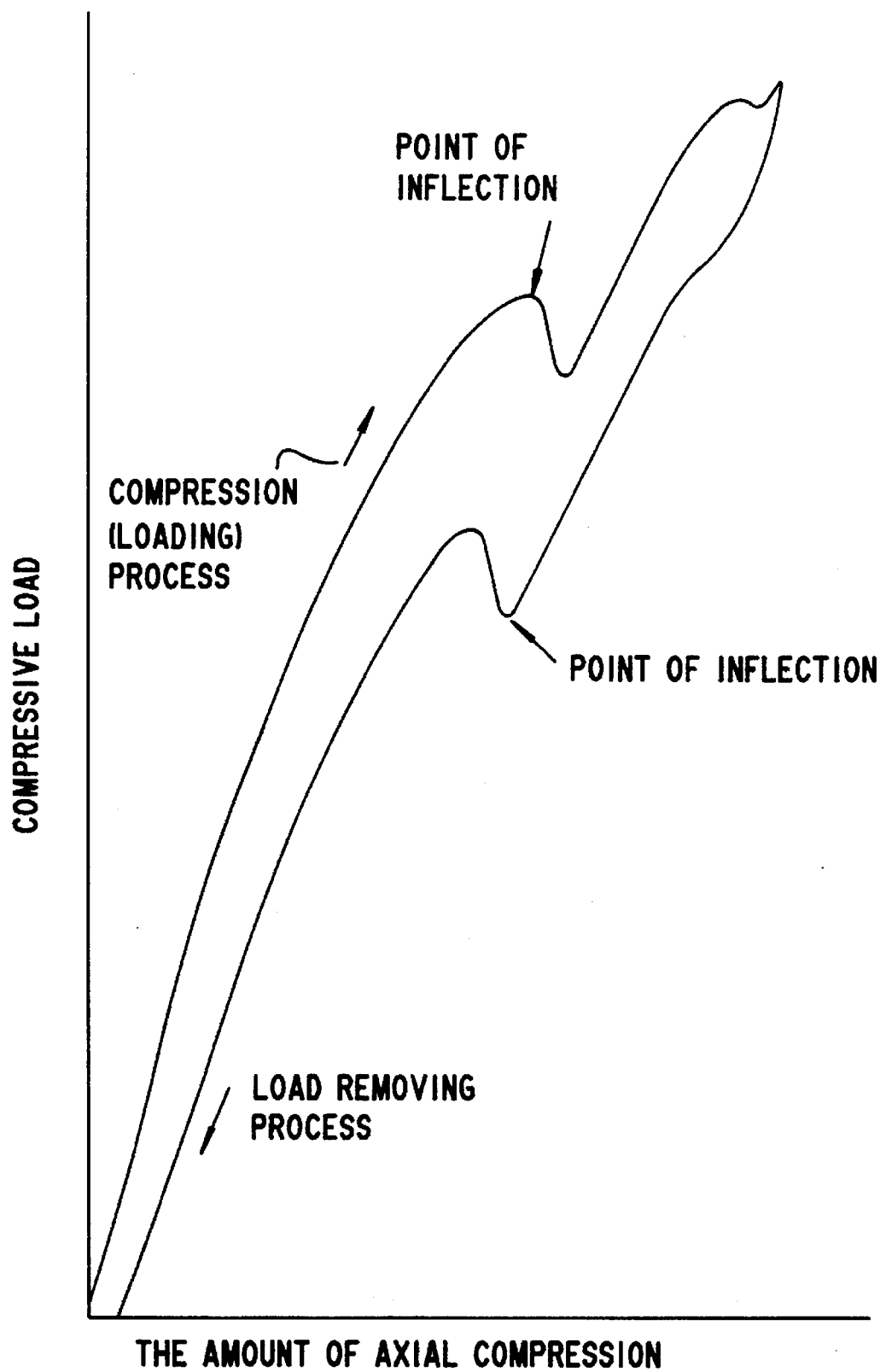
FIG. 4 is a graph of compressive load versus amount of axial compression in the conventional resin boot.

Table 4 shows the percentage compression between ridges during attachment of the resin boot of the embodiment shown in FIG. 1. Therefore, during compression, it rarely occurs (as it does in the prior art,) that the slope 3c extending from the first ridge 3a1 to the first trough 3b1 (said slope 3c being referred to as 3c1) and the slope 3c extending from the first trough 3b1 to the second ridge 3a2 (said slope 3c being referred to as 3c2) approach each other to the extent that the slope 3c2 suddenly falls toward the larger diameter side 1 rather than being perpendicular to the center line X of the boot. Thus, as shown in FIG. 2, no point of inflection occurs in the compressive load versus amount of axial compression graph. Therefore, even when the joint takes a large operating angle, a great bending strain will hardly take place in the trough 3b closer to the larger diameter side 1 since the amount of compression in each trough 3b is consumed in good balance in stretching the bellows portion 3. Further, on the compression side, the contact pressures between adjacent slopes are evenly balanced in the individual portions, so that it never occurs that the contact pressure between particular slopes is greater than the contact pressure between other slopes. Therefore, contact wear between the slopes 3c1 and 3c2 and between other adjacent slopes hardly occurs.

As described above, this resin boot is high in the bending fatigue resistance of the troughs 3b and hardly produces a point of inflection in the compressive load versus amount of axial compression graph. Therefore, despite the fact that this resin boot is as compact as a rubber (CR) boot, it has demonstrated durability greater than that of conventional resin boots in various durability tests.

What is claimed is:

1. A resin boot for constant velocity universal joints comprising a larger diameter portion, a smaller diameter portion and a bellows portion between said larger and smaller diameter portions, said bellows portion comprising a sequence of ridges and troughs arranged alternately, the ratio of the thickness of each trough to the thickness of each adjoining ridge being in the range of from more than 1.0 to less than 1.5, the thicknesses of each trough being substantially the same, and the thicknesses of each ridge being substantially the same, the angle of inclination formed with respect to the center line of the boot by the slope extending from the ridge to the trough toward the larger diameter portion of the bellows portion being smaller than that of the slope which extends from the ridge to the trough toward the smaller diameter portion.

2. A resin boot for constant velocity universal joints as set forth in claim 1, characterized in that the boot is made of a resin material whose hardness is $H_D$ 43–48.

* * * * *